G. B. DUSINBERRE.
SPRING CLIP.
APPLICATION FILED DEC. 17, 1917.
1,367,805. Patented Feb. 8, 1921.
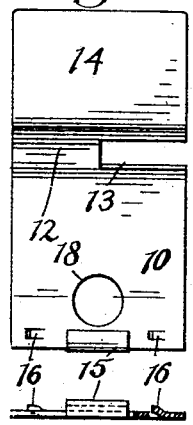
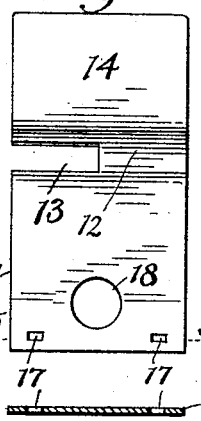
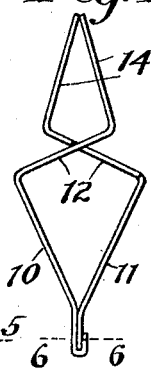
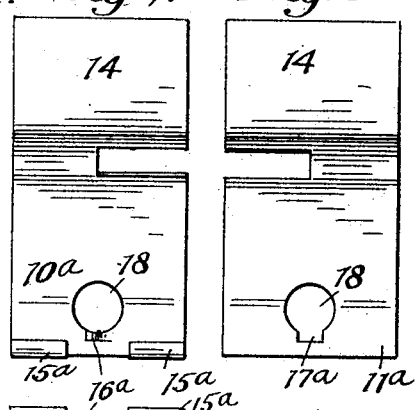
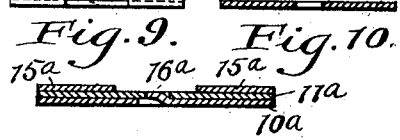
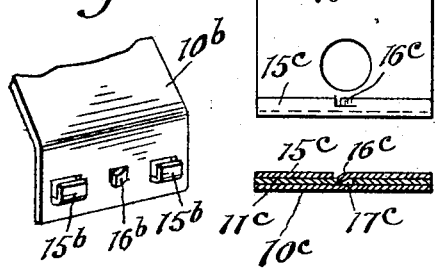
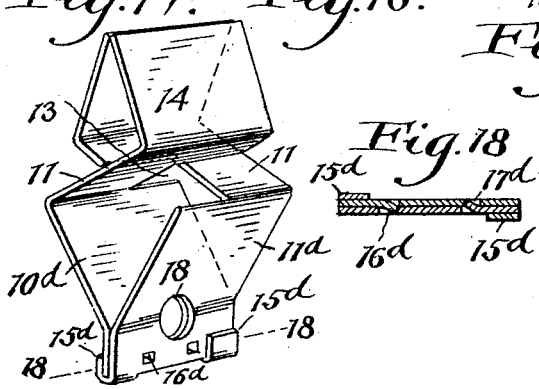
Inventor:
George B. Dusinberre.
By Thurston & Kwis
attys.

UNITED STATES PATENT OFFICE.

GEORGE B. DUSINBERRE, OF CLEVELAND, OHIO.

SPRING-CLIP.

1,367,805.

Specification of Letters Patent.

Patented Feb. 8, 1921.

Application filed December 17, 1917. Serial No. 207,424.

*To all whom it may concern:*

Be it known that I, GEORGE B. DUSINBERRE, a citizen of the United States, residing at Cleveland, in the county of Cuyahoga and State of Ohio, have invented a certain new and useful Improvement in Spring-Clips, of which the following is a full, clear, and exact description.

This invention relates to spring clips, and in certain respects is an improvement over the construction shown in my prior application, Serial No. 147,364, filed February 8, 1917.

The principal object of this invention is to provide a clip whose parts can be easily formed and assembled, and which is so designed that when the two members of the clip are shifted into their proper relative positions they are automatically interlocked against accidental displacement and require no deformation and no screws, rivets, or equivalent fastening devices to hold them in their proper relationship.

The above objects are attained in this invention by the provision of a clip having for its principal feature the fact that when the two members of the clip are brought into alinement in their proper relative positions by sliding them relatively and laterally, they will be automatically interlocked against displacement in any direction, and at the same time are so held together that the jaws formed by crossing the forward portions have a natural tendency to spring together, due to the inherent resiliency of the material of one or both members.

The invention may be briefly summarized as consisting in certain novel details of construction, and combinations and arrangements of parts which will be described in the specification and set forth in the appended claims.

In the accompanying sheet of drawings, Figure 1 is an edge view of a clip constructed in accordance with one form of my invention; Figs. 2 and 3 are plan views of the two members of the clip moved apart and ready for assemblage by sliding one laterally over the other: Fig. 4 is an end view of Fig. 2 with a portion in section; Fig. 5 is a sectional view along the line 5—5 of Fig. 3: Fig. 6 is a slightly enlarged sectional view along the line 6—6 of Fig. 1; Figs. 7 and 8 are views corresponding to Figs. 2 and 3, showing a modification; Figs. 9, 10 and 11 are views corresponding to Figs. 4 to 6, but embodying the modification of Figs. 7 and 8; Fig. 12 is a perspective view of the clip shown in Figs. 1 to 6; Fig. 13 is a similar view showing the modification of Figs. 7 to 11; Fig. 14 is a perspective view of a portion of one of the clip members showing a further modification; Fig. 15 is a face view of a similar member showing a still further modification; Fig. 16 is a view corresponding to Figs. 6 and 11, but embodying the modification of Fig. 15; Fig. 17 is a perspective view showing a further modification; Fig. 18 is a cross sectional view substantially along the line 18—18 of Fig. 17.

The clip constructed in accordance with my invention, in any of its different forms, is composed of two members, preferably of metal, and designated generally by the reference characters 10 and 11, and at least one, but preferably both of which are formed of resilient material. The two members when assembled, have crossed portions 12, and this crossing is preferably accomplished by notching each member from one edge inwardly to about the center, as shown at 13. Forwardly of the crossed portions are jaws 14 which are normally held or pressed together by the resiliency of the material but can be spread or opened by pressing together the body portions of the clips at the rear of the crossed portions, as will be readily understood.

The shape of the jaws forward of the crossing portions, and the shape of the body or rear part of the clip rearwardly of the crossing portions can be modified as desired, but as shown in Fig. 1, the forward jaw portions taper down to the forward ends, and the body tapers or converges toward the rear end of the clip.

The principal features and advantages of the clip of this invention are due to the fact that both members of the clip are completely formed or shaped prior to assemblage, this being preferably accomplished by dies in the blanking out process, and to the fact that by the mere act of assembling, as by sliding one relative to the other, they are held in their proper relationship under tension, and are automatically interlocked against disalinement without requiring any deformation, or the use of securing devices such as screws or rivets.

In all forms of the invention these results are formed in part by the provision of a so-called reactive abutment at the rear portion of at least one member and under which the rear portion of the other member slides preferably by a relative lateral movement of the two members. In Fig. 1 the reactive abutment is formed at the rear end of member 10 and consists of a reversely bent tongue 15 which forms a groove through which the rear part of the other member slides in assembling the two members into clip form. Additionally the member 10 is provided near its corners with a pair of upstanding elastic or flexible tongues 16, or detents, and the other member 11 is provided with openings 17 into which these tongues spring when the two parts are slid laterally into their final relative positions. When they are thus slid together by relative lateral movement, with the rear parts brought together as shown in Fig. 1, and in perspective in Fig. 12, the necessary tension is imposed in the metal or material, and the reactive abutment keeps the members from spreading apart at the rear ends, while the spring locking tongues prevent disalinement or further relative lateral movement in either direction. This will be most apparent from a consideration of Fig. 6.

In Figs. 7, 8 and 13 I have shown a slight modification, the members here designated $10^a$ and $11^a$. As here shown, the member $10^a$ has instead of the central single reversely bent tongue or reactive abutment of Fig. 2, two such reversely bent tongues designated $15^a$, and instead of having two elastic locking tongues, it has a single central locking tongue $16^a$, and the coöperating member $11^a$ has a central opening $17^a$ adapted to receive the locking tongue $16^a$. With this construction the same results are obtained as with the construction shown in Figs. 2 and 3, for it will be seen that when the parts are assembled by moving them laterally into their normal relative positions, the tongues $15^a$ hold the parts under tension in the normal relationship, and the interlocking portions formed by the spring tongue or detent $16^a$ and the notch $17^a$ prevent disalinement. In this case the notch or opening $17^a$ is formed as a part of a main opening 18, which is preferably formed in both members of all forms of the clip to provide means by which the clip can be readily suspended on a hook, nail, or the like, as when the clip is used as a paper clip.

The reactive abutment and interlock can, if desired, be fashioned in still different ways. For example, in Fig. 14 the clip member which corresponds to the member 10 of Fig. 2, and $10^a$ of Fig. 7, but designated $10^b$ in Fig. 14, has the reactive abutment formed by striking up tongues $15^b$ just forwardly of the rear edge of the clip.

In Fig. 15, the similar clip member $10^c$ has the reactive abutment $15^c$ formed by reversely bending the entire rear end of the member, and this clip member is further modified by having the elastic locking tongue $16^c$, which prevents disalinement, struck or bent inward from the tongue $15^c$. The manner in which the locking tongue $16^c$ automatically springs into the opening $17^c$ of the companion clip member $11^c$ when the parts are brought into their final relative positions, is illustrated in Fig. 16.

In Figs. 17 and 18 I have shown a still further modification which, while embodying the principle of the first described constructions, has an important advantage over the same. In these last mentioned figures the clip is composed of two members $10^d$ and $11^d$, which are exact counterparts, and can therefore be formed from the same set of dies. In this construction the reactive abutment is formed part on one member and part on the other by providing at one rear corner of each part a reversely bent tongue $15^d$, the rear end of each member sliding under the tongue of the companion member, and when the parts are assembled one tongue being on one side of the clip and the other tongue on the opposite side. Additionally, each member has a locking detent or tongue $16^d$, and also a recess or opening $17^d$ which receives the locking detent or tongue of the other member. The manner in which the detent on each part springs into the opening or recess of the other part to prevent disalinement is best shown in Fig. 18.

It will be seen therefore, that the objects previously stated are attained by the clip construction herein shown. It will be apparent also that the clip can be modified in many different ways, some of which I have shown in the drawing, without departing from my invention.

Having described my invention, what I claim is:

1. A spring clip composed of two members having crossed portions and jaws at the forward ends of the members, the rear ends being relatively fixed, the rear part of one member being bent to form a reactive abutment which is engaged by the rear portion of the other member causing the jaws to be pressed into engagement by the resiliency of the material, and the rear engaging portions of the members having interlocking portions automatically brought into locking relationship by sliding the two members into their normal relative positions.

2. A spring clip composed of two members having crossed portions and at their forward ends having jaws which are normally pressed together by the inherent resiliency of the material, the rear ends of said members being relatively fixed, said members being previously formed, and having portions which interlock when the parts are moved laterally together in their proper relationship and hold the members under tension and prevent their disalinement.

3. A clip composed of two members having crossed portions forming jaws which are held together by the resiliency of at least one of the members, the rear ends of said members being relatively fixed, and one having a bent portion constituting a reactive abutment under which the other is moved so as to hold the parts under tension when the two members are moved together in proper relationship, and said members having an interlock which automatically prevents disalinement of said members.

4. A clip composed of two previously formed crossed members having at their forward ends jaws which are held together by the inherent resiliency of the material, the rear portions of said members being relatively fixed, and said members having portions which automatically interlock to prevent disalinement when the parts are brought together in normal relative positions by relative lateral movement of the two members.

5. A spring clip composed of two members having crossed portions forming jaws which are normally held together by the inherent resiliency of the material, one of said members having at its rear end a bent portion forming a reactive abutment under which the rear part of the other member engages, and the rear portions of both members having interlocking parts comprising a tongue on one part and a recess in the other, which parts automatically interlock when the members are brought into their normal relative positions.

6. A spring clip composed of two members having crossed portions with jaws at their forward ends normally held together by the inherent resiliency of the material, the rear portions of said members being in engagement and relatively fixed, and the extreme end of one being bent back on itself forming a forwardly facing groove or slot which receives the end of the companion member and forming a portion constituting a reactive base which holds the rear portions in engagement and imposes tension in the forward portions.

In testimony whereof I hereunto affix my signature.

GEORGE B. DUSINBERRE.